United States Patent
Totev

(10) Patent No.: US 10,273,839 B2
(45) Date of Patent: Apr. 30, 2019

(54) INTERNAL COMBUSTION ENGINE GAS EXCHANGE VALVE HYDRAULIC ACTUATOR

(71) Applicant: Lachezar Totev, Sofia (BG)

(72) Inventor: Lachezar Totev, Sofia (BG)

(73) Assignee: L.T.A.G. LTD, Sofia (BG)

( * ) Notice: Subject to any disclaimer, the term of this patent is extended or adjusted under 35 U.S.C. 154(b) by 111 days.

(21) Appl. No.: 15/547,536

(22) PCT Filed: Jun. 29, 2015

(86) PCT No.: PCT/BG2015/000018
§ 371 (c)(1),
(2) Date: Jul. 31, 2017

(87) PCT Pub. No.: WO2016/000048
PCT Pub. Date: Jan. 7, 2016

(65) Prior Publication Data
US 2018/0010490 A1 Jan. 11, 2018

(30) Foreign Application Priority Data

Jul. 4, 2014 (BG) .......................... 111788

(51) Int. Cl.
*F01L 9/02* (2006.01)
*F01L 1/26* (2006.01)
(Continued)

(52) U.S. Cl.
CPC .................... *F01L 9/02* (2013.01); *F01L 1/16* (2013.01); *F01L 1/267* (2013.01); *F01L 9/021* (2013.01);
(Continued)

(58) Field of Classification Search
CPC . F01L 9/025; F01L 9/021; F01L 2001/34446; F01L 1/267; F01L 9/02;
(Continued)

(56) References Cited

U.S. PATENT DOCUMENTS 5,248,123 A * 9/1993 Richeson .................. F01L 9/04
123/90.11
5,868,059 A * 2/1999 Smith .................... F15B 11/006
137/596.16

(Continued)

FOREIGN PATENT DOCUMENTS

DE 102 05 888 A1 10/2003

*Primary Examiner* — Mark A Laurenzi
*Assistant Examiner* — Wesley G Harris
(74) *Attorney, Agent, or Firm* — Bay State IP, LLC

(57) ABSTRACT

The invention relates to an internal combustion engine gas exchange valve actuator and is used to displace one or more internal combustion engine valves thereby improving the operation and extending the capabilities of the engine. The actuator includes a casing (2) attached to the engine head (1) and with a hollow cylinder (3) formed inside it and containing a reciprocating piston (6) with a piston rod. Provision is made in the casing (2) which is closed by a cap (4), for a loop for controlled charging and discharging of the pressurized fluid and for a solenoid valve with direct electromagnetic control. The solenoid valve is positioned above the piston (6) and is formed as a plunger (19) having a lower cylindrical widening with axial orifices (20) and an upper part with a central recess (22) and radial orifices (23) and (24).

6 Claims, 2 Drawing Sheets

(51) Int. Cl.
*F01L 13/00* (2006.01)
*F04B 53/10* (2006.01)
*F16K 31/06* (2006.01)
*F01L 1/16* (2006.01)
*F01L 1/344* (2006.01)

(52) U.S. Cl.
CPC ............... *F01L 9/023* (2013.01); *F01L 9/025* (2013.01); *F01L 13/0015* (2013.01); *F04B 53/10* (2013.01); *F16K 31/0655* (2013.01); *F01L 2001/34446* (2013.01); *Y02T 10/18* (2013.01)

(58) Field of Classification Search
CPC ......... F01L 13/0015; F01L 9/023; F01L 1/16; Y02T 10/18; F16K 31/0655; F04B 53/10
USPC ............................................ 251/30.01, 30.02
See application file for complete search history.

(56) References Cited

U.S. PATENT DOCUMENTS

| | | | |
|---|---|---|---|
| 6,192,841 B1 | 2/2001 | Vorih | |
| 6,568,360 B2* | 5/2003 | Cristiani | F01L 9/02 123/90.12 |
| 2002/0185091 A1 | 12/2002 | Vorih | |
| 2004/0065855 A1* | 4/2004 | Van Weelden | F01L 9/02 251/30.01 |

* cited by examiner

INTERNAL COMBUSTION ENGINE GAS EXCHANGE VALVE HYDRAULIC ACTUATOR

CROSS REFERENCE TO RELATED APPLICATION

This application is for entry into the U.S. National Phase under § 371 for International Application No. PCT/BG2015/000018 having an international filing date of Jun. 29, 2015, and from which priority is claimed under all applicable sections of Title 35 of the United States Code including, but not limited to, Sections 120, 363, and 365(c), and which in turn claims priority under 35 USC 119 to Bulgarian Patent Application No. 111788 filed on Jul. 4, 2014.

TECHNICAL FIELD OF THE INVENTION

The invention relates to an internal combustion engine gas exchange valve actuator for axial displacement of a valve and is applicable as a driving mechanism for axial displacement of one or more valves in various engine types. In particular, the proposed actuator can be used to provide axial displacement of gas-exchange valves in internal combustion piston engines, controlling gas-distribution processes in internal combustion engines by driving single or paired gas exchange valves, thereby eliminating the need for conventional cam shafts and expanding the engine capabilities.

THE BACKGROUND OF THE INVENTION AND PRIOR ART

WO 2014/007727 A1 [1], a publication dated Jan. 9, 2014, of international patent request PCT/SE2013/050780 makes known the 'Actuator for axial displacement of a gas-exchange valves of internal combustion engines'. According to [1], the actuator comprises a casing attached to the cylinder head of the engine, with a hollow internal cylinder open at the bottom end and containing an axially aligned two-way moving piston whose upper part connects to a piston rod axially aligned with the open hollow cylinder. The piston with its piston rod comprise the driven part of the actuator, the piston rod being made of two parts—an upper, thicker part fitting tightly to an opening in the actuator casing, and a lower, thinner part connecting the thicker part to the piston in the cylinder. The head part of the thick portion of the piston rod contacts a chamfered portion of the hollow recess space co-axial to the hollow cylinder. A diametrical opening is formed in this part of the piston rod, and a spring-loaded return valve located in an internal chamber in the piston closes off an axial opening along the rod axis. The inner chamber of the piston contains also a positioning piston reciprocating along its axis relative to the actuator piston, and contains the check-valve spring. The positioning piston interacts with the internal combustion engine valve stem which, moving through the internal combustion engine, enters the actuator cylinder. A conventional spring returns the opened internal combustion engine valve to its closed position.

The actuator case includes a circuit for controlled filling of pressurised gaseous fluid into the upper above-piston volume, on the piston rod side, and for removal of the fluid from that upper part in order to act upon the actuator piston and ensure its movement. The fluid circuit is connected to a pressurised gaseous fluid source and to a discharge-fluid receiver. Direct or indirect controlled fluid filling and discharging is provided for, one embodiment option including an indirect electrically controlled valve in the actuator-control fluid circuit, and another option including directly controlled electrical magnet acting upon the actuator body. The actuator includes also additional primary and secondary hydraulic circuits. The primary additional circuit represents an inlet through a fluid (hydraulic oil) filled check valve connecting the space in the casing above the upper part of the piston rod with the space in the casing above the head part of the piston rod, occupied by the upper surface of the free end of the piston rod at its top position, and an outlet via the controlled valve of the fluid receiver. The second auxiliary circuit comprises the envisioned diametral and co-axial openings in the piston rod connected via the check valve to the internal chamber in the piston, whereby the fluid (the hydraulic oil) bypasses the positioning piston to reach the lower part of the cylinder volume below the actuator piston. Thus, a hydraulic braking device is formed in the casing above the bevelled end of the piston rod and in the space formed above it, reducing the actuator piston speed before the free end of the piston-rod contacts the upper surface of the space, acting as a mechanical limiting stop in the casing.

The main emphasis regarding the actuator described in [1] is placed upon the hydraulic braking device described above and intended to reduce the valve speed exactly before valve head contacts the valve seat in the engine cylinder, ensuring controlled closing motion intended to preserve the details, and to reduce wear and disharmonious operation. When the engine valve closes, the actuator rod contacts the mechanical stop within the actuator casing and, the valve head contacting its seat in order to ensure correct deceleration of the actuator piston rod when the valve closes. The mechanical contact with the stop in the casing determines the final stage of engine-valve deceleration, but the linear elongation of the valve induced by higher temperatures during operation means that the upper end of the piston rod will come into contact with the actuator casing space of the hydraulic braking device, and that the elongated engine valve will not close completely, which is inadmissible. This problem has been resolved by way of the envisaged positioning piston acting as a hydraulic compensator within the inner chamber of the lower portion of the actuator piston and contacting the engine valve.

The deceleration effect of the envisaged hydraulic braking device in the mechanism described in [1] is variable, which is explained as follows: Upon entry into the hydraulic braking device space formed in the casing above it, the upper part of the piston rod displaces the hydraulic fluid contained in this space. Sufficient clearance is required between the casing and the piston-rod end, to allow the fluid to leave the space, but the clearance should not be too large because in that case the decelerating effect will be lost. The decelerating effect begins shortly before the engine valve reaches its fully-closed position under the force of its spring. Since internal combustion engines operate within a wide frequency range of rotation, the resistance of the hydraulic decelerating device will change as the engine RPM changes, i.e. increasing RPM increases also the force required to overcome this resistance. The engine valve spring creates a constant valve-closing force. Since increasing the engine RPMs increases the force required to overcome the resistance of the hydraulic braking device, this changing force will have an opposite effect on the permanent force of the valve spring, i.e. the decelerating effect of the braking device will vary, causing longer valve-closing delay. The decelerating effect of the braking device will be increased by the return motion of the piston in the cylinder pushing the gas out from the actuator cylinder. As this pushing is caused also by the valve spring, via a constant section opening, a resistance will be created requiring higher overcoming force at higher RPMs. The piston resistance when emptying the actuator cylinder volume will counteract the closing of the engine valve along its entire length of travel toward the closed position, and since as soon as the hydraulic braking device is actuated, both forces will be totalized, i.e. the decelerating effect of the braking device will be augmented by the same effect caused by the moving actuator piston. The decelerating effect of the hydraulic braking device will also arise when the engine valve opens. Since the end of the piston rod has reached the mechanical stop in the space of the hydraulic device casing and has expelled the fluid from this volume, the actuator piston, performing its reverse, engine-valve opening movement, the vacuum created above the rod exiting the space above it will counteract the opening of the engine valve. This will also delay the opening of the engine valve, creating a secondary deceleration effect and showing that the braking device described herein operates as a reciprocating unit, decreasing the speed of the gas-exchange valve as it closes, shortly before the valve contacts its seat, and, secondly, as the valve opens. The secondary deceleration of the gas exchange valve is undesirable.

The changing decelerating effect of the braking device and the secondary deceleration of the gas-exchange valve when opening and closing are undesirable and result in reduced valve actuator operation security and, ultimately, deteriorated engine operation.

The use of solenoid valves to control the fluid in the pneumatic portion of the actuator will increase its operational noise levels. Increased noise is also caused by the fluid (gas) exiting the cylinder volume of the actuator via the envisaged complex-shaped and relatively long discharging channel.

The need for additional devices to drive the pneumatic part (a compressor or a pressurized gas-tank) for the hydraulic and the pneumatic parts used in the actuator complicates the operation and size of this mechanism.

SUMMARY OF THE INVENTION

The invention is intended to create an Internal combustion engine gas exchange valve actuator ensuring increased security of operation with controlled closing and opening of engine valves, reduced noise levels during operation and a more compact construction.

The proposed internal combustion engine gas exchange valve actuator includes a casing attached to the engine cylinder head and shaped internally as a hollow cylinder which is opened at the bottom and hosts an axially reciprocating piston rigidly connected to a piston rod, which forms the driving part of the actuator, with a circuit being provided for in the casing for controlled charging and discharging of pressurized fluid acting upon the actuator piston and ensuring its movement, and the charging and discharging of the fluid is ensured by a directly controlled solenoid valve, and a space of one hydraulic braking device is shaped in the upper part of the actuator and coaxial to the hollow cylinder.

According to the invention, the reciprocating piston placed in the lower part of the hollow cylinder represents a hollow cylinder unilaterally open at the top and having in its inner part a primary brake cylinder and a secondary brake cylinder which are coaxially nested in each other and are axially reciprocating relative to the hollow cylinder to which they are coaxial. The primary brake cylinder is hollow and opened unilaterally at the top, while the secondary brake cylinder is hollow, unilaterally opened at the bottom and nested in the internal hollow part of the primary brake cylinder. Interposed between the two brake cylinders is a spring and in the upper closed end of the secondary brake cylinder are axial orifices arranged in a circle and one central axial orifice. The two brake cylinders with the spring interposed between them, and the axial opening form a main braking device. Above the piston in the casing, a circlip is positioned dividing the internal cylindrical surface of the hollow cylinder in two parts, with a brake seat formed in the lower part and narrowing radially the internal discharging part of the cylinder. Placed above the circlip, inside the hollow cylinder and coaxial to the piston is the solenoid valve formed as a plunger and consisting of a lower cylindrical widened part and an upper cylindrical part of a smaller diameter. In the lower part of the plunger axial orifices are formed and arranged in a circle, and the upper cylindrical part of the plunger is positioned in a cylindrical recess formed as a cap which closes the upper part of the hollow cylinder and of the casing. Formed in the upper part of the plunger are a central recess and radial orifices which, jointly with the space between the end face of the plunger and the cap, form the hydraulic braking device. In the casing, above and below the circlip, a primary charging channel and a secondary charging channel are formed respectively and are connected to the engine lubrication manifold, and formed above the widened lower part of the plunger, in the casing, are discharging orifices of the loop for controlled charging and discharging of the pressurized fluid.

In the wall of the piston, immediately above its bottom, are formed two opposite radial orifices, while the envisaged axial orifices in the upper closed end of the secondary brake cylinder are positioned in a radial widening formed around the external periphery of the cylinder and used as a support for the spring that envelops coaxially the primary brake cylinder. Its lower closed end is formed as a peripheral and external radial widening acting as a support for the lower end of the spring. In the lower end of the wall of the hollow cylinder and above its bottom two radial orifices are formed, while a discharging channel situated in the wall of the hollow cylinder above the brake seat, and the two radial orifices positioned immediately above the bottom of the piston and opposite each other, form an additional braking device.

According to one preferred embodiment, the central recess which is formed in the upper cylindrical part of the plunger and is part of the hydraulic braking device is connected by the radial orifices to the space around the upper cylindrical part of the plunger. Below these radial orifices, the additional radial orifice is formed and connected to the recess, the diameter of the additional orifice being smaller than the diameter of the upper radial orifices. Rested against the upper face end of the widened part of the plunger is one end of a plunger spring which envelops partially the upper cylindrical part of the plunger, while the other end of this plunger spring is rested against the internal part of the closing cap.

The piston rod is formed in the lower end of the reciprocating piston placed in the cylinder and is in contact with a hydraulic lifter representing a hydraulic compensator whose lower part is rested against the face of the stem of the engine valve installed in the cylinder head and loaded by a valve spring.

The primary charging channel is formed internally in the casing, in the area around the lower end of the widened part of plunger, while the secondary charging channel is formed externally to the lower end of the casing. The two charging channels are connected to the lubrication manifold via two mutually intersecting and formed on one side of a fastening bracket radial orifice and axial orifice. The lower end of the casing is attached to the cylinder head of the engine via the fastening bracket by means of bolts and is sealed to the engine by one of the bolts passed through the bracket's axial orifice and by a bracket seal positioned around the axial opening of the fastening bracket. The inner surface of the fastening bracket is sealed to the external surface of the casing by means of bracket seals positioned on both sides of the secondary charging channel in the casing.

The electromagnetic control of the solenoid valve includes, fixed externally to the upper part of the closing cap, an electromagnetic coil connected to an electronic control unit, whereby the upper cylindrical part of the plunger, positioned in the recess of the closing cap, is an electromagnetic armature in the range of the electrical coil.

The advantages of the Internal combustion engine gas exchange valve actuator are the higher security and lowered noise levels during its engine valve controlled closing and opening action, because of the hydraulic braking device on the one hand, and on the other hand, because of the primary and secondary braking devices created additionally according to the invention to control the movement of the engine valves. Since no secondary braking effect is exhibited by the braking devices controlling the movement of the engine valves, the operation of the internal combustion engine remains harmonious. The above-described actuator is hydraulic, using the existing internal combustion engine oil system and not needing any additional pipes and devices, which makes its construction simple and compact.

BRIEF DESCRIPTION OF THE DRAWINGS

The invention is explained in more detail on the attached figures which disclose the invention without limiting it, as follows.

DETAILED DESCRIPTION OF PREFERRED EMBODIMENTS

Figure 1:
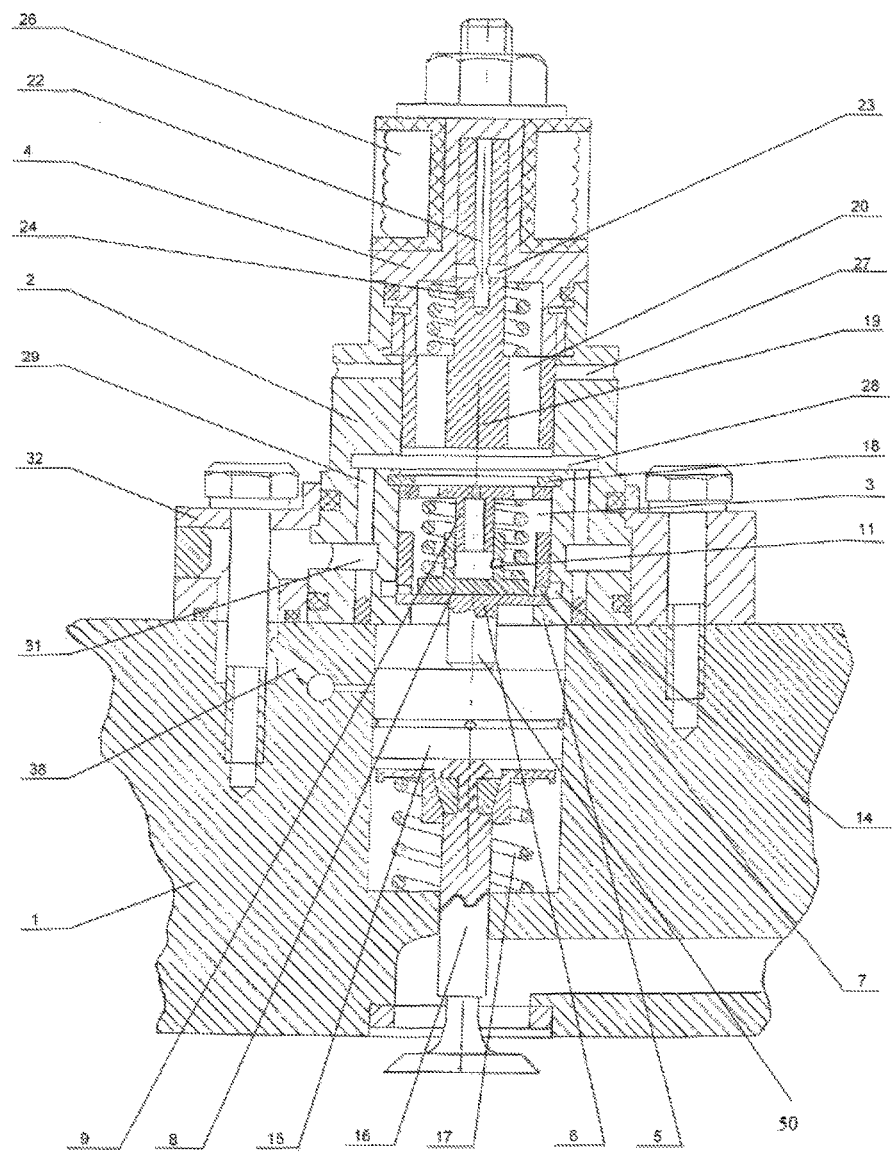
FIG. 1 shows a vertical section along the axis of the actuator and along part of the cylinder head of the internal combustion engine with the gas-exchanging valve in the opened position.

According to the invention, the Internal combustion engine gas exchange valve actuator includes a hydraulic actuator with direct electric control, attached to the cylinder head 1 of an engine by its casing 2 in which a hollow cylinder 3 is formed and opened at the bottom, while its upper part is closed by a closing cap 4 attached to the casing 2 by a threaded connection and sealed onto the casing by means of a rubber seal. The internal discharge end of the lower end of the hollow cylinder 3 is narrowed radially by a brake seat 5 formed there. Above the brake seat 5, in the lower portion of the hollow cylinder 3 and coaxial to it is a reciprocating piston 6 with a piston rod 50 formed in its lower end, both comprising the driven mechanism of the actuator. The piston 6 represents a hollow cylinder with a single opening at its upper end and has, positioned immediately above the bottom of the piston 6, two opposing radial openings 7. Internal to the piston 6 are a primary brake cylinder 8 and a secondary brake cylinder 9, which are axially reciprocating relative to the hollow cylinder 3 to which they are coaxial as they are coaxial to each other. The primary brake cylinder 8 is hollow and unilaterally open at the top, and has an external radial widening formed at its bottom to support the lower end of a spiral spring 10 interposed between the two brake cylinders 8 and 9 and enveloping coaxially the primary brake cylinder 8. The lower end of the primary brake cylinder 8 has two radial orifices 11. The secondary brake cylinder 9 is also hollow and unilaterally open at the bottom, positioned in the internal hollow part of the primary brake cylinder 8. Formed around the upper closed end of the secondary brake cylinder 9 is a peripheral external radial widening acting as a support for the upper end of the spiral spring 10 and having axial openings 12 arranged in a circle. Formed in the closed upper end of the hollow secondary brake cylinder 9 is a central axial orifice 13.

A discharging channel 14 is envisaged above brake seat 5 formed in the wall of the hollow cylinder 3 which is placed in the casing 2, connecting the inside of the piston 6 to the space external to the cylinder via the two opposite and situated above the bottom of the piston 6 radial orifices 7.

The piston rod of the piston 6 inside the cylinder 3 rests permanently against the upper surface of the hydraulic lifter 15 which comprises a hydraulic compensator known from the state of the art and whose lower part rests against the end face of the stem of a valve mounted in the cylinder head 1 of the engine 16 and tensioned by the valve spring 17.

The upper part of the secondary brake cylinder 9 rests against a circlip 18 which is nested in a channel created in casing 2 and divides in two the inner cylindrical surface inside the casing 2 of the hollow cylinder 3. Above the circlip 18, in the upper part of the hollow cylinder 13, there is a reciprocating and coaxial to the cylinder 3 axially moving electromagnetically controlled plunger 19 which comprises a control valve of the actuator. The plunger 19 comprises a lower cylindrical widened part which is in contact with the inner cylindrical surface of the hollow cylinder 3 and an upper cylindrical part of a smaller diameter, both parts comprising one whole unit. The lower widened part of the plunger 19 contains six axial orifices 20 arranged in a circle. The upper cylindrical part of the plunger 19 is positioned inside within a coaxial cylindrical recess in the closing cap 4, with space 21 and forming between the upper closed end of this recess and the face of the upper cylindrical part of the plunger 10 a space 21. In the upper part of the plunger 19 there is a central recess 22 and two radial orifices 23 which connect the space external to the central recess 22 with the space around the cylindrical part of the plunger 19. Underneath the two radial orifices 23 in the upper cylindrical part of the plunger 19 there is an additional radial orifice 24, whose diameter is smaller than the diameter of the two radial orifices 23 above and it also connects the space external to the central recess 22 with the space around the upper cylindrical part of the plunger 19. Resting against the upper face of the widened part of the plunger 19 is one end of a spiral plunger spring 25 which envelops partially the upper cylindrical part of the plunger 19. The other end of the plunger spring 25 rests against the internal part of the closing cap 4.

Attached to the upper part of the closing cap 4 and external to it is a statically fixed electric coil 26, connected to an electronic control unit (ECU). An embodiment is possible whereby the coil 26 is fixed to the closing cap 4 by means of a nut and bolt, fixed rigidly to the closing cap 4 and comprising its extension. The upper cylindrical part of the plunger 19, positioned inside the hollow cylindrical opening of the closing cap 4 and staying within the range of the electrical coil 26, acts as an electromagnetic armature.

Above the widened lower cylindrical part of the plunger 19, in the wall of its surrounding case 2, there are eight discharging orifices 27 which connect the internal space of the envisaged in the casing 2 hollow cylinder 3 with the external space. In the casing 2, above the circlip 18 installed inside it, in the area of the lower end of the widened lower cylindrical part of the plunger 19 is a primary charging channel 28 which divides eight radially to the wall of the casing 2 axial recesses 29. The outlets in the casing 2 of these eight recesses 29 toward the cylinder head 1 of the engine are closed by means of plugs 30. External to the lower end of the casing 2, below the charging channel 28, is a secondary charging channel 31. The primary and the secondary charging channels 28 and 31 and the discharging orifices 27 form a circuit for controlled charging and discharging of pressurized fluid acting upon the piston 6 of the actuator, and the controlled charging and discharging of the fluid is provided for by the direct-electromagnetic control valve (the plunger 19).

The lower end of the casing 2 is attached to the cylinder head 1 of the engine by means of a fastening bracket 32 held down with bolts 33. The inner surface of the fastening bracket 32 is sealed against the external surface of the casing 2 by means of two bracket seals 34. The bracket seals 34 are fitted within two channels formed on the outside of the casing 2, on both sides of the secondary charging channel 31 in casing 2. On one side of the fastening bracket 32 are two mutually intersecting orifices, radial orifice 35 and axial orifice 35. One end of the radial orifice 35 connects to the secondary charging channel 31 formed in the lower end of the casing 2, while its other end is closed with a plug 37. The axial orifice 36 is, via the cylinder head 1 of the engine, connected by means of the orifice 38 to the existing oil manifold of 39 of the engine. The fastening bracket 32 is sealed to cylinder head 1 of the engine by one of the bolts 33 passed through the bracket's axial orifice 36 and by a bracket seal 40 positioned around the axial opening 36 of the fastening bracket 32.

The space 21 formed in the closing cap 4 in the upper part of the actuator and the end face of the upper cylindrical part of the plunger 19 and the central recess 22, the two radial orifices 23 and the additional radial orifice 24 shaped in this part, form a hydraulic braking device of the actuator.

The primary brake cylinder 8 and the secondary brake cylinder 9 with the central axial orifice 13, both positioned in the hollow cylinder 3, inside piston 6, form, together with the interposed spring 10, one main braking device of the actuator acting upon the engine valve.

The discharging channel 14 formed inside the case 2 on the wall of the cylinder 3, together with the opposing and positioned inside cylinder 3 and situated immediately above the bottom of the piston 6 radial orifices 7, an additional braking device of the actuator.

Application of the Invention

According to the invention, the operation of the internal combustion engine gas exchange valve actuator is as follows:

Deenergizing the electric coil 26 of the electronic control unit (ECU) initiates the closing of the valve 16 of the internal combustion engine (FIG. 1). Since the upper cylindrical part of the plunger 19 comprises a solenoid armature within the range of the electromagnetic field of the coil 26, without voltage supplied to the coil 26, the plunger 19 is acted upon only by the plunger spring 25 and is pushed downwards to its ultimate position of end-face contact with the circlip 18. The six axial orifices 20 positioned in a circle in the widened lower part of the plunger 19 ensure transferring of the oil fed by the centralized-lubrication oil pump of the internal combustion engine. On its downward travel, leaving the space 21 formed in the closing cap 4, the upper part of the plunger 19 creates vacuum, attempting to fill the space 21 with oil via the additional small-diameter radial orifice 24 in the upper cylindrical part of the plunger 19 and governing the operation of the hydraulic braking device. An undesirable secondary braking effect occurs here, potentially causing delayed opening of the valve 16 and ultimately preventing harmonious operation of the engine. This disadvantage is compensated for by calibration of the additional radial orifice 24 that enables operation of the hydraulic braking device whereby the secondary braking effect is eliminated at the maximum engine rotation speed. This secondary braking effect continues until such time at which the two radial orifices 23 in the upper cylindrical part of plunger 19 cross the plane of the internal wall of the closing cap 4, acting as the upper support of the plunger spring 25. As the upper cylindrical part of the plunger 19 moves further downward, the two radial orifices 23 formed in this part of the plunger 19 equate the pressure in the space 21 of the hydraulic braking device with the pressure in the inside the hollow cylinder 3. The secondary braking effect is discontinued and the plunger 19, acted upon by the plunger spring 25, reaches freely its lowermost position (end-face contact with the circlip 18). In this manner the lower cylindrical widened part of the plunger 19, having closed the first charging channel 28 and, at the same time, having opened the eight discharging orifices 27, causes the valve 16 to attempt, under pressure by the tensioned valve spring 17, to close while pushing up the hydraulic lifter 15. The hydraulic lifter 15 pushes up the piston 6 by acting upon its piston rod, the piston 6 being in its lowermost position until the moment of lowering of the pressure inside the hollow cylinder 3 and its lowest part being in contact with the brake seat 5.

Moving upward, the piston 6 starts to push oil through the open discharging orifices 27 out of the hollow cylinder 3. Upon separation of the lower edge of the piston 6 a very short distance away from the brake seat 5, the internal space of the piston 6 connects via the two opposite radial orifices 7 positioned immediately above its bottom to the wall of the hollow cylinder 3 where the discharging channel 14 is formed by the additional braking device. This releases a certain quantity of oil from inside the hollow cylinder 3, i.e. the oil from the inside the hollow cylinder 3 does not flow out through the discharging orifices 27 only. Here, the secondary braking effect of the additional braking device is not exhibited since as the piston 6 moves upward, when occurrence of the secondary braking effect may be expected, the discharging orifices 27 are already open. The pressure in the hollow cylinder 3 is released, and the residual oil which has to be pushed by the piston 6 out of cylinder 3 will cause minimal resistance on piston 6 since the total section of the eight discharging orifices 27 is large and the discharging orifices 27 themselves are straight and of minimal length. This enables rapid discharging of the oil from the hollow cylinder 3, i.e. the braking effect of the additional braking device is manifested only once and exactly when needed, and operates as a braking device only if pressure exists in cylinder 3.

Moving upward inside the upper part of the piston 6, the primary brake cylinder 8 slides internally against the external surface of the secondary brake cylinder 9, initially unobstructed, since the oil leaving the closed space between the two brake cylinders 8 and 9 is discharged through the two radial orifices 11 in the lower end of the primary brake cylinder 8 and through the central axial orifice 13 of the secondary brake cylinder 9 until the moment when the two radial orifices 11 in the primary brake cylinder 8 close. Then the remaining oil which needs to exit the diminishing volume between the nested brake cylinders 8 and 9 can leave only through the central axial orifice 13 of the secondary brake cylinder 9. This is the exact moment when the braking effect of the main braking device begins. The main braking device is intended to reduce the strength of the impact of the head of the engine valve 16 against its seat, in order to reduce their mutual wearing, thereby reducing noise and losses during operation of the internal combustion engine. The movement of the primary and secondary brake cylinders 8 and 9 of the main braking device ends when the brake cylinders are in full contact with each other. The moment of synchronized stopping of the valve head 16 against its seat and the stopping of the primary and secondary brake cylinders 8 and 9 against each other, in contact with circlip 18, are the result of the action of the hydraulic lifter 15 comprising a known hydraulic compensator.

This valve 16 can remain in this closed state until the time at which the electric coil 26 is energized.

Figure 2:
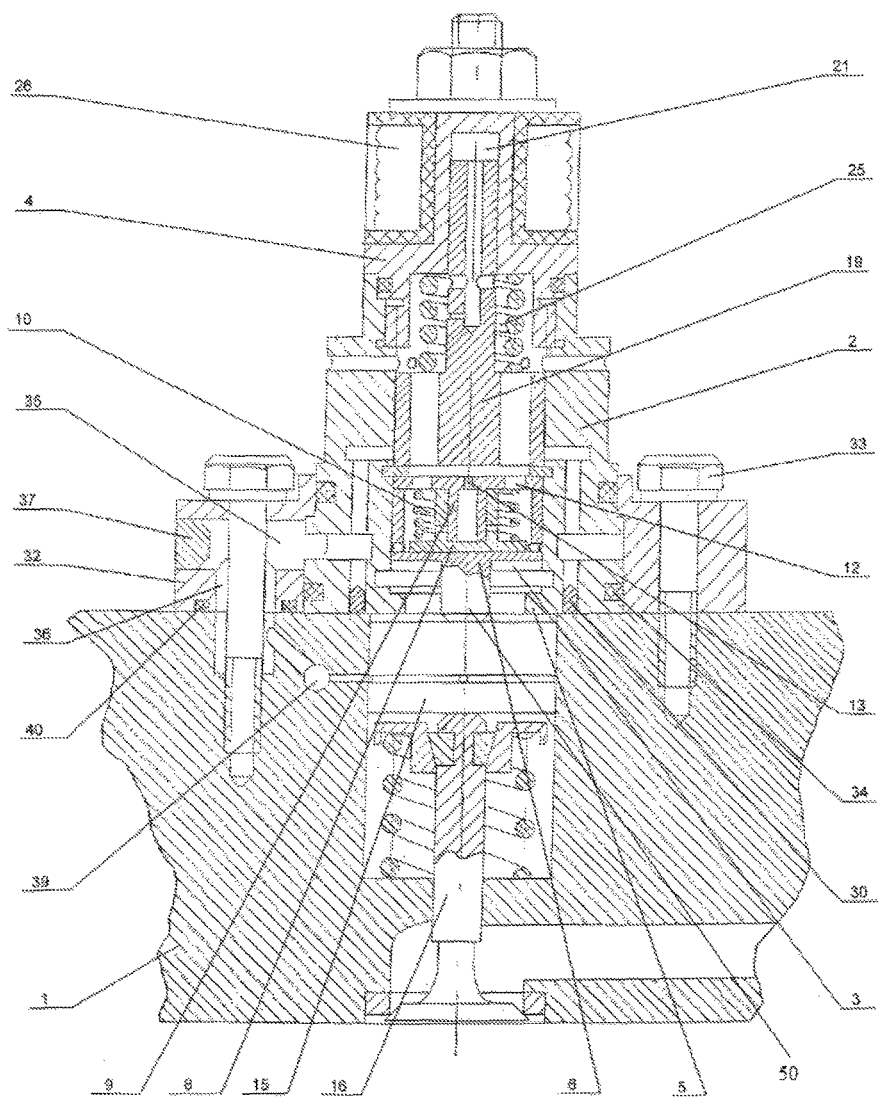
FIG. 2 is a vertical section along the axis of the actuator and along part of the cylinder head of the internal combustion engine with the gas-exchanging valve in the closed position.

With valve 16 fully closed (FIG. 2), the electric coil 26, energized by the electronic control unit (ECU), generates an electromagnetic field, moves the plunger 19 upward, overcoming the resistance of the plunger spring 25 and the resistance of the oil in the space 21 of the hydraulic braking device. The upward movement of the plunger 19 is unobstructed until the two radial orifices 23 in the upper cylindrical part of the plunger 19 move past the edge of the inner wall of the closing cap 4, this inner wall acting as the upper support for the plunger spring 25. As the radial orifices 23 move past the edge of the wall of the closing cap 4, the plunger 19 continues to move upward, thereby initiating the first braking effect of the braking device since the oil closed within the space 21 can leave only through the additional radial opening 24 in the upper cylindrical part of the plunger 19. This hydraulic braking device is intended to reduce the force with which the end of the upper cylindrical part of the plunger 19 contacts the bottom of the space 21 in the cap 4 and, in this manner, to reduce the noise generated by this contact. When the end of its upper cylindrical part contacts the bottom of the closing cap 4 where the space 21 is formed, the plunger 19 stops moving. At the same time, the upper edge of the lower widened cylindrical part of the plunger 19 has closed the discharging orifices 27, and the lower edge of this widened part has opened the first charging channel 28, whereby the oil entering the cylinder 3 pushes the piston 6 downward until it opens the valve 16 fully. The valve 16 stays open while the electric coil 26 is energized.

When the downward movement of the piston 6 begins, the two brake cylinders 8 and 9 begin to come apart from each other forced only by the interposed spiral spring 10, since the first brake cylinder 8 is not attached to the piston 6. The oil attempting to enter the space between the two brake cylinders 8 and 9 may enter only through the central axial orifice 13 of the secondary brake cylinder 9. The orifice 13 governs the operation of the main braking device and it is important that it should be calibrated to allow the primary brake cylinder 8 to follow the piston 6 at the highest movement frequency of the actuator. Otherwise a distance will be created between the piston 6 and the brake cylinder 8. During the subsequent reverse motion of the piston 6, if the two brake cylinders 8 and 9 have not extended as far from each other as to open the two radial orifices 11 in the primary brake cylinder 8, the braking effect of the main device will vary with the varying operating volume. This embodiment of the main braking device does not exhibit a secondary braking effect.

Directly prior to the piston 6 reaching its lowermost position and prior to the contact of its lower edge against the brake seat 5, both radial orifices 7 formed above the bottom of the piston 6 come against the discharging channel 14 connecting momentarily the inner space of the hollow piston 6 with the space external to the cylinder 3 and, thereby, release a certain amount of oil. This causes instantaneous abrupt deceleration of the piston 6 and as its lower edge contacts the upper edge of the brake seat 5, the piston 6 closes the discharging channel 14, thereby terminating the releasing of oil.

The braking devices described and shown in the example embodiment of the invention require calibration of the orifices governing their operation to ensure normal operation of the internal combustion engine at the highest rotation frequencies.

The actuator described in the example embodiment may be used in various applications, but it may be applied mainly and most easily in renovation of existing internal-combustion engines. Minimal structural alterations are required to adapt this mechanism to existing four-stroke internal combustion engines. Using this mechanism allows radical change in the operation of internal combustion engines and transmission drives. An average conventional internal combustion engine can, at a relatively low cost, be converted into an engine of higher class—economical, environmental and, as required, sufficiently powerful, allowing for engine-weight reduction. The effect will be especially good in trucks with very heavy engines in which reducing the number of operating cylinders (made possible with the proposed invention) will bring forth fuel economy because of reduced weight constantly present in the vehicle, thereby reducing vehicle maintenance and price.

The mechanism proposed with the invention allows for independent control of each gas-exchange valve of the internal-combustion engine, thereby not requiring engine operation at averaged ignition timing values when the gas-exchange valves open and close. This means that the above timings will always be optimal for the particular rotation frequency throughout the entire operational frequency range of the internal combustion engine. The total electronic control of gas-exchange valve operation on the one hand and the electronic control of fuel supply on the other will result in fuel savings. Also, the above-mentioned control when using the actuator in four-stroke internal combustion engines will result directly in improved environmental performance. As a whole, the noise generated by the internal combustion engines will decrease and the engine performance will improve.

The crankshaft journals of four-cylinder four-stroke internal combustion engines in general use are staggered at one hundred and eighty degrees in pairs, i.e. when two pistons in the engine cylinders are at top dead centre (TCD), the other two pistons are at the bottom dead centre (BDC). The working stroke in one cylinder in these engines is formed by two full crankshaft rotations, i.e. two full crankshaft rotations produce a cycle of four consecutive working strokes at one hundred and eighty degree intervals, one working stroke per cylinder. The described actuator, according to the invention, can be used to change the above-mentioned four-stroke internal-combustion engine operation so that the working strokes may double at a certain time, decrease by half at another time, and be made less frequent at a subsequent condition, with simultaneous alteration of the cylinder working volume and complete control of the changes in engine operation. The following table shows this above-mentioned possible alteration of internal-engine operation modes.

| Mode of operation | Crankshaft rotation | Working strokes |
| --- | --- | --- |
| 1 | 360° | 2 working strokes 2 × 2 |
| 2 | 720° | 4 working strokes 4 × 1 |
| 3 | 2160° | 4 working strokes 4 × 1 |

To provide for the above-mentioned change in the operation of conventional internal-combustion engines using the proposed internal combustion engine gas exchange valve actuator, according to the invention, certain preliminary, preparatory steps are required, such as:

coupling of a rotary compressor to the internal combustion engine by mechanical means;

recessed end faces of the pistons in the cylinders of the internal-combustion engine preventing contact between the piston face and the gas exchange valves open as the pistons reach top dead centre;

equipping of the engine with a rotary oil dispensing pump for the engine;

forming the cylinder head cover to enable positioning of the electrical coils in the upper end of the actuator, according to the invention, outside of the space enclosed by the cover;

providing of the engine with a direct fuel injection system with direct electrical control;

equipping of the engine with an additional electronic control unit (ECU) controlling the operation of the gas-exchange valves;

equipping of the engine with a TDC and LDC detector covering the operating modes shown in the table above;

equipping of the engine with an accelerator pedal position detector.

Since the operating mode shown first in the table, 2×2 working strokes for a 360 degree rotation of the crankshaft, involves only two strokes, the use of an external rotary compressor is required to provide scavenging and charging of the cylinders with fresh air. The need for rotary compressors coupled mechanically to the internal combustion engines is also imposed by the low efficiency of conventional compressors at low rotation frequencies. Operating in this mode and using the actuator proposed herein, the engine produces twice the power of an engine operating in a four-stroke mode only.

The second mode in the table, 4×1 working strokes for a 720 degree rotation of the crankshaft is the conventional four-stroke mode of operation of internal combustion engines. The power output in this mode of operation is twice lower than that of the preceding first mode of operation shown above.

The power output of the third operating mode in the table, with 4×1 working strokes for a 2160 degree rotation of the engine, is lower than that of the previous second mode of operation and lower engine rotation frequency results from the longer periods between the working cycles. This engine power and rotation-frequency reduction is particularly efficient in the cases of idling, movement with minimal loads etc.

The individual control of gas-exchange valves by means of the actuator, according to the invention, allows for removal of the throttle valve which, in principle, prevents good filling and ventilation of the internal-combustion engine cylinders. At present such operation is made possible by controlled shifting of the closing time of exhaust valves during the compression stroke. This time may vary between two limit values—from the time the piston starts moving toward TDC and until the time when the piston is located prior to TDC and can compress a certain amount of air which provides a working stroke of minimal power. Therefore, the piston does not compress the entire cylinder volume, i.e. the volume is not a constant but a variable quantity. This ensures smooth rotation of the internal combustion engine without the use of a throttle valve whose position detector must be relocated to the accelerator pedal.

The mode of operation is selected via a manually controlled unit with three mode settings, located conveniently on the gear-shift lever whereby placing the hand over the lever allows easy changing between its three settings with the thumb or with the index finger. The switching is possible only after the entire cycle of the current operating mode is complete, regardless of the position of the control unit defining the required mode.

In the 4×1 stroke mode of operation with 2160 degrees of crankshaft rotation, the internal combustion engine will operate more slowly and there will be times during operation of the vehicle with very low engine rotation frequency. This will cause a critical reduction of the pressure within the engine oil lines since the efficiency of conventional oil pumps decreases as rotation frequencies decrease. Such a decrease in the pressure of the engine oil lubrication system is undesirable and, furthermore, it will impact the operation of the valve actuator, which requires constant high pressure. These two circumstances make the use of a more efficient rotary pump imperative.

In the 2×2 stroke mode of operation with 360 degrees of crankshaft rotation, feeding of the fuel in a pre-combustion chamber is impossible because the piston in the cylinder does not perform the intake and exhaust strokes, thereby imposing the need for a system injecting the fuel directly into the cylinders.

The electronic control unit (ECU) comprises a digital electronic devices based on three circular counters acting as frequency dividers via triggers and suitable interlinks. The divider outputs are united by logical elements forming channels for controlling of the electrical coils of the gas-exchange valve actuators.

The invention claimed is:

1. An internal combustion engine gas exchange valve actuator comprising:

a casing attached to an engine cylinder head and shaped internally as a hollow cylinder which is opened at a bottom;

an axially reciprocating piston located within the casing;

a piston rod rigidly connected to the axially reciprocating piston and wherein the piston rod forms a driving part of the internal combustion engine gas exchange valve actuator;

a circuit being provided in the casing for controlled charging and discharging of a pressurized fluid acting upon the axially reciprocating piston and ensuring the axially reciprocating piston's movement;

wherein the charging and discharging of the pressurized fluid is ensured by a directly controlled solenoid valve, and wherein a space of one hydraulic braking device is shaped in an upper part of the internal combustion engine gas exchange valve actuator and coaxial to the hollow cylinder;

wherein the axially reciprocating piston (6) placed in a lower part of the hollow cylinder (3) represents a hollow cylinder unilaterally open at a top and wherein the axially reciprocating piston further comprises:
  a primary brake cylinder (8);
  a secondary brake cylinder (9), wherein the primary brake cylinder and the secondary brake cylinder are coaxially nested in each other and are axially reciprocating relative to the hollow cylinder (3) to which they are coaxial;
  wherein the primary brake cylinder (8) is hollow and opened unilaterally at the top, while the secondary brake cylinder (9) is hollow, unilaterally opened at a bottom and nested in an internal hollow part of the primary brake cylinder (8);
  a spring, wherein the spring is interposed between the the primary and secondary brake cylinders
  a set of axial orifices located in an upper closed end of the secondary brake cylinder (9) arranged in a circle and one central axial orifice (13);
  wherein the primary and secondary brake cylinders (8) and (9) with the spring (10) interposed between them, and the central axial orifice (13) form a main braking device;
a circlip is located (18) is located above the axially reciprocating piston (6) in the casing (2), and is positioned dividing an internal cylindrical surface of the hollow cylinder (3) in two parts, with a brake seat (5) formed in the lower part and narrowing radially an internal discharging part of the cylinder;
a solenoid valve, wherein the solenoid valve is formed as a plunger (19) and placed above the circlip (18), inside the hollow cylinder (3) and coaxial to the axially reciprocating piston (6), wherein the solenoid valve further comprises:
  a lower cylindrical widened part;
  an upper cylindrical part of a smaller diameter;
  wherein in the lower part of the plunger (19) axial orifices (20) are formed and arranged in a circle, and the upper cylindrical part of the plunger (19) is positioned in a cylindrical recess formed as a cap (4) which closes the upper part of the hollow cylinder (3) and of the casing (2);
  a central recess (22) is formed in the upper part of the plunger (19) and radial orifices (23) and (24) which, jointly with a space (21) between an end face of the plunger (19) and the cap (4), to form a hydraulic braking device;
a primary charging channel (28) and a secondary charging channel (31) are located in the casing (2), above and below the circlip (18), and are formed respectively, and are connected to an engine lubrication manifold (39), and formed above a widened lower part of the plunger (19), in the casing (2), are discharging orifices (27) of a loop for controlled charging and discharging of the pressurized fluid.

2. The internal combustion engine gas exchange valve actuator of claim 1, further comprising two opposite radial orifices (7) formed in the wall of the axially reciprocating piston (6), immediately above its bottom;
  wherein the axial orifices (12) in the upper closed end of the secondary brake cylinder (9) are positioned in a radial widening formed around an external periphery of the cylinder (9) and used as a support for the spring (10) that envelops coaxially the primary brake cylinder (8) whose lower closed end is formed as a peripheral and external radial widening acting as a support for a lower end of the spring (10);
  wherein a lower end of the wall of the hollow cylinder (8) and above the hollow cylinder's bottom two radial orifices (11) are formed; and
  wherein a discharging channel (14) situated in the wall of the hollow cylinder (3) above the brake seat (5), and the two radial orifices (7) positioned immediately above the bottom of the axially reciprocating piston (6) and opposite each other, form an additional braking device.

3. The internal combustion engine gas exchange valve actuator of claim 1, wherein the central recess (22) formed in the upper cylindrical part of the plunger (19) is connected by the radial orifices (23) to the space around the upper cylindrical part of the plunger (19);
  wherein below these radial orifices (23), the additional radial orifice (24) is formed and connected to the recess (22), the diameter of the additional orifice (24) being smaller than the diameter of the upper radial orifices (23); and
  wherein one end of a plunger spring is rested against the upper face end of the widened part of the plunger (19) which envelops partially the upper cylindrical part of the plunger, while the other end of the plunger spring (25) is rested against the internal part of the closing cap (4).

4. The internal combustion engine gas exchange valve actuator of claim 1, wherein the piston rod is formed in a lower end of the axially reciprocating piston (6) placed in the cylinder (3) and is in contact with a hydraulic lifter (15) representing a hydraulic compensator whose lower part is rested against a face of a stem of an engine valve (16) installed in the cylinder head (1) and loaded by a valve spring (17).

5. The internal combustion engine gas exchange valve actuator of claim 1, wherein a primary charging channel (28) is formed internally in the casing (2) in an area around the lower end of the widened part of the plunger (19), and the secondary charging channel (31) is formed externally in the lower end of the casing (2);
  wherein the two charging channels (28) and (31) are connected to the engine lubrication manifold (39) via two mutually intersecting orifices formed in one side of a fastening bracket (32) radial orifice (35) and axial orifice (36);
  wherein the lower end of the casing (2) is attached to the cylinder head (1) of the engine via the fastening bracket (32) by means of bolts (33) and is sealed to the engine by one of the bolts (33) passed through the bracket's axial orifice (36) and a bracket seal (40) positioned around the axial opening (36) of the fastening bracket (32);
  wherein the inner surface of the fastening bracket (32) is sealed to an external surface of the casing (2) by means of bracket seals (34) positioned on both sides of the secondary charging channel (31) in the casing (2).

6. The internal combustion engine gas exchange valve actuator of claim 1, wherein an electromagnetic control of the solenoid valve comprises:
  an electrical coil (26) fixed externally to the upper part of the closing cap (4);
  an electronic control unit connected to the electrical coil (26);

an electromagnetic armature in the range of the electrical coil (26) positioned in the recess of the closing cap (4).

\* \* \* \* \*